(No Model.)

J. C. MILLIGAN.
FIRE SHOVEL.

No. 310,069. Patented Dec. 30, 1884.

WITNESSES
Wm A. Skinkle
Geo W. Breck

INVENTOR
John C. Milligan.
By his Attorneys
Pope Edgecomb & Butler

N. PETERS, Photo-Lithographer, Washington, D. C.

UNITED STATES PATENT OFFICE.

JOHN C. MILLIGAN, OF BROOKLYN, ASSIGNOR TO THE LALANCE & GROS-JEAN MANUFACTURING COMPANY, OF NEW YORK, N. Y.

FIRE-SHOVEL.

SPECIFICATION forming part of Letters Patent No. 310,069, dated December 30, 1884.

Application filed October 16, 1883. (No model.)

*To all whom it may concern:*

Be it known that I, JOHN C. MILLIGAN, a citizen of the United States, residing in Brooklyn, in the county of Kings and State of New York, have invented certain new and useful Improvements in Fire-Shovels, of which the following is a specification.

The object of the invention is to produce a fire-shovel from a single piece of metal in such a manner as to have greater strength and rigidity than those heretofore made of the same material.

My invention consists in stamping the shovel from a piece of sheet metal, and in forming a strengthening-rib along each side of the blade, which ribs meet and join in the middle of the base of the handle, and extend thence preferably throughout its length.

Figure 1:
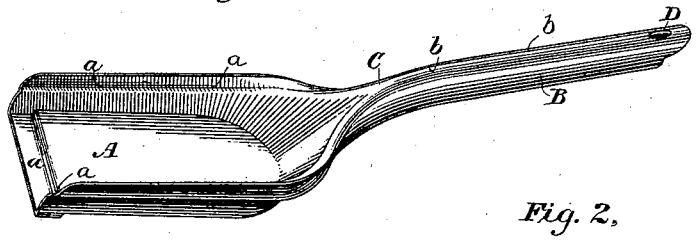
Figure 2:
Figure 3:
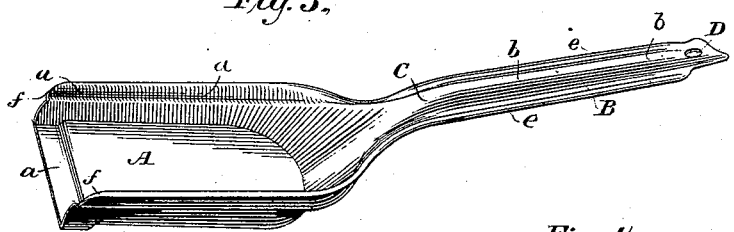
Figure 4:
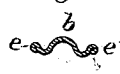
Figure 5:

In the accompanying drawings, Figure 1 is a view of one form of shovel embodying my invention, and Fig. 2 represents a cross-section of the handle. Figs. 3, 4, and 5 are like views of a slightly-different form of shovel, illustrating a modification of my invention.

Referring to the drawings, A represents the blade of a shovel, and B the handle, both being formed from a single piece of metal. Across the lower end of the blade A and along both its sides are formed strengthening-ribs, each of which is produced by enlarging the sides of the shovel laterally, so as to form a step or ledge, and then continuing the sides upward, as usual, leaving lateral and vertical portions, each serving to support the other, in the form of an L-shaped rib, $a$, the main portions of each uniting at the point C at the base of the handle, and continuing thence preferably along its entire length in the form of the ridge $b$.

In the form shown in Fig. 1, the vertical portion of the strengthening-rib is turned outward and under at or near the point C, to form the nearly-cylindrical handle B. (Shown in cross-section, Fig. 2.)

In the modification illustrated in Fig. 3 the main portions of the strengthening-ribs meet at the point C at the base of the handle, as in Fig. 1; but, instead of turning the remaining portions outward from the blade and under, so as to form a cylindrical hollow handle, they are folded outward and then back, forming a bead, $e$, and leaving the handle comparatively flat, as shown in cross-section, Fig. 4. The essential features, therefore, are precisely the same as in Fig. 1; but in this construction the edges of the handle, instead of being formed nearly cylindrical, are preferably folded back, forming the flat-beaded handle. (Shown in section in Fig. 4.) The fold or bead $e\ e$ may, if desired, be extended along the sides of the blade to the points $f f$, as shown in cross-section in Fig. 5, thus affording additional strength to the shovel. It is not necessary in all instances to extend the rib or angle across the end of the blade. By this method of forming a shovel the blade combines great strength within a wide surface, the angles formed by the strengthening-ribs and ridges not only making the article very rigid, but increasing its capacity. At the same time the union of these ribs at the handle and the continuation of the resultant ridge along the middle of the same render that portion of the shovel which receives the greatest strain especially durable. The extra strength acquired by this mode of forming a shovel permits the use of a lighter grade of iron than has been generally used, thus cheapening the cost of the article.

I am aware that a shovel has been made having a flat bottom and upturned sides and having a series of terraces extending in an unbroken line entirely around the sides, and also that a shovel has been made having a single projecting flange outward from the sides of the blade and extending partly up on the edges of the handle, and with a handle having raised portions at the upper and lower ends, with an intermediate depression, and I make no claim to these constructions.

I claim as my invention—

1. A fire-shovel having a hollow handle, both blade and handle being stamped from a single piece of metal, having a strengthening-rib extending along each side of the blade, said ribs merging into a ridge at the middle of the handle and extending throughout the same.

2. A fire-shovel having a hollow handle, both blade and handle being stamped from a single piece of metal, having L-shaped strengthening-ribs extending along each side of the blade, joining at the handle and extending throughout the same, substantially as set forth.

3. A shovel formed from a single piece of sheet metal, having a hollow handle, with L-shaped angles or strengthening-ribs across the front edge of the blade and along each side, joining at the handle and extending along the middle of the same throughout its length, substantially as described.

4. A fire-shovel stamped from a single piece of metal, having the L-shaped strengthening-rib $a$, the ridge $b$, and the fold $c$, extending throughout its entire length, substantially as described.

In testimony whereof I have hereunto subscribed my name this 13th day of October, A. D. 1883.

JOHN C. MILLIGAN.

Witnesses:
  W. S. HOLBROOK,
  JAMES COCHRAN.